United States Patent [19]

Sekimura et al.

[11] Patent Number: 4,712,874
[45] Date of Patent: Dec. 15, 1987

[54] FERROELECTRIC LIQUID CRYSTAL DEVICE HAVING COLOR FILTERS ON ROW OR COLUMN ELECTRODES

[75] Inventors: Nobuyuki Sekimura, Kawasaki; Masaru Kamio, Atsugi; Hideaki Takao; Taiko Motoi, both of Sagamihara; Tatsuo Murata, Atsugi, all of Japan

[73] Assignee: Canon Kabushiki Kaisha, Tokyo, Japan

[21] Appl. No.: 943,502

[22] Filed: Dec. 19, 1986

[30] Foreign Application Priority Data

Dec. 25, 1985 [JP] Japan .................. 60-290423
Dec. 25, 1985 [JP] Japan .................. 60-290424

[51] Int. Cl.⁴ ............................................. G02F 1/13
[52] U.S. Cl. .............................. 350/339 F; 350/336; 350/339 R; 350/350 S
[58] Field of Search ............... 350/333, 339 R, 339 F, 350/350 S, 336

[56] References Cited

U.S. PATENT DOCUMENTS 4,593,977 6/1986 Takamatsu et al. ............. 350/339 F
4,593,978 6/1986 Mourey et al. ............... 350/350 S X
4,610,507 9/1986 Kamamori et al. ......... 350/339 F X
4,659,182 4/1987 Aizawa ........................... 350/339 F Primary Examiner—Stanley D. Miller
Assistant Examiner—Richard Gallivan
Attorney, Agent, or Firm—Fitzpatrick, Cella, Harper & Scinto

[57] ABSTRACT

A ferroelectric liquid crystal device comprises a pair of substrates each provided with a stripe electrode, and a ferroelectric liquid crystal disposed between the substrates. At least one of the substrates has thereon a layer of discretely defined color filters disposed along the stripe electrode, and electroconductive or insulating films disposed between the discretely defined color filters.

26 Claims, 12 Drawing Figures

FERROELECTRIC LIQUID CRYSTAL DEVICE HAVING COLOR FILTERS ON ROW OR COLUMN ELECTRODES

FIELD OF THE INVENTION AND RELATED ART

The present invention relates to a ferroelectric liquid crystal device adapted for a color display panel, particularly a ferroelectric liquid crystal device containing a color filter layer.

Hitherto, a liquid crystal device using a TN (twisted nematic) type liquid crystal has been known, as shown in "Voltage-Dependent Optical Activity of a Twisted Nematic Liquid Crystal" by M. Schadt and W. Helfrich, *Applied Physics Letters* Vol. 18, No. 4 (Feb. 15, 1971), pp. 127-128. However, such a TN-liquid crystal device involves a problem of causing crosstalk when it is constructed to have a high density of pixels formed with a matrix electrode structure and is driven in a time-division manner, so that the number of pixels has been restricted.

Further, there has been known a display system wherein pixels are respectively provided with a thin film transistor (TFT) and are switched thereby one by one. This system however involves a problem that it requires a complicated step of forming TFTs on a substrate, so that it is difficult to form a display device of a large area.

In order to obviate the above-mentioned drawbacks of the conventional types of liquid crystal devices, Clark and Lagerwall have proposed the use of a liquid crystal device having bistability (U.S. Pat. No. 4,367,924, etc.). In order for a ferroelectric liquid crystal device to show desired driving characteristics, it is necessary that the ferroelectric liquid crystal disposed between a pair of parallel substrates is in a molecular alignment such that two stable states thereof are effectively switched from one to the other. For example, with respect to a ferroelectric liquid crystal having a chiral smectic phase, it is necessary to form a region (monodomain) wherein the liquid crystal molecular layers in the chiral smectic phase are perpendicular to the substrate faces and accordingly the liquid crystal molecular axes are almost in parallel with the substrate faces.

Incidentally, in order to apply a ferroelectric liquid crystal device to a color display panel, it is necessary to dispose a color filter layer in the device. The thickness of the color filter layer is generally set to 2000 Å - 10 $\mu$m in order to attain a prescribed optical characteristic. Particularly, in a case of a resin film or inorganic film colored with a colorant such as pigment or dye, it is necessary to provide a thickness on the order of generally 5000 Å - 3 $\mu$m.

On the other hand, the liquid crystal layer thickness in the above-mentioned ferroelectric liquid crystal device is made thin enough to unwind or release the helical structure of a chiral smectic liquid crystal, more specifically on the order of 1-10 $\mu$m. Furthermore, when the liquid crystal layer thickness in the ferroelectric liquid crystal device is nonuniform, an ideal monodomain of the liquid crystal is not formed, therefore the difference in liquid crystal layer thickness is required to be suppressed within 10% over the entirety.

However, when a substrate with a color filter layer is applied to a ferroelectric liquid crystal device, there results in a large difference in liquid crystal layer thickness between a part where the color filter layer is provided and a part where no color filter layer is provided, so that there has arisen a problem that the difference in liquid crystal layer thickness exceeds the above-mentioned tolerable range.

SUMMARY OF THE INVENTION

Therefore, an object of the present invention is to provide a ferroelectric liquid crystal device having solved the above-mentioned problems.

Thus, according to the present invention, there is provided a ferroelectric liquid crystal device, comprising a pair of substrates each provided with a stripe electrode and a ferroelectric liquid crystal disposed between the substrates; at least one of the substrates having thereon a layer of discretely defined color filters disposed along the stripe electrode and electroconductive films disposed between the discretely defined color filters. Preferably, the difference between the height of the layer of color filters and the height of the electroconductive or insulating films, respectively from the substrate face, is set to 1000 Å or less.

DETAILED DESCRIPTION OF PREFERRED EMBODIMENTS

Figure 1:
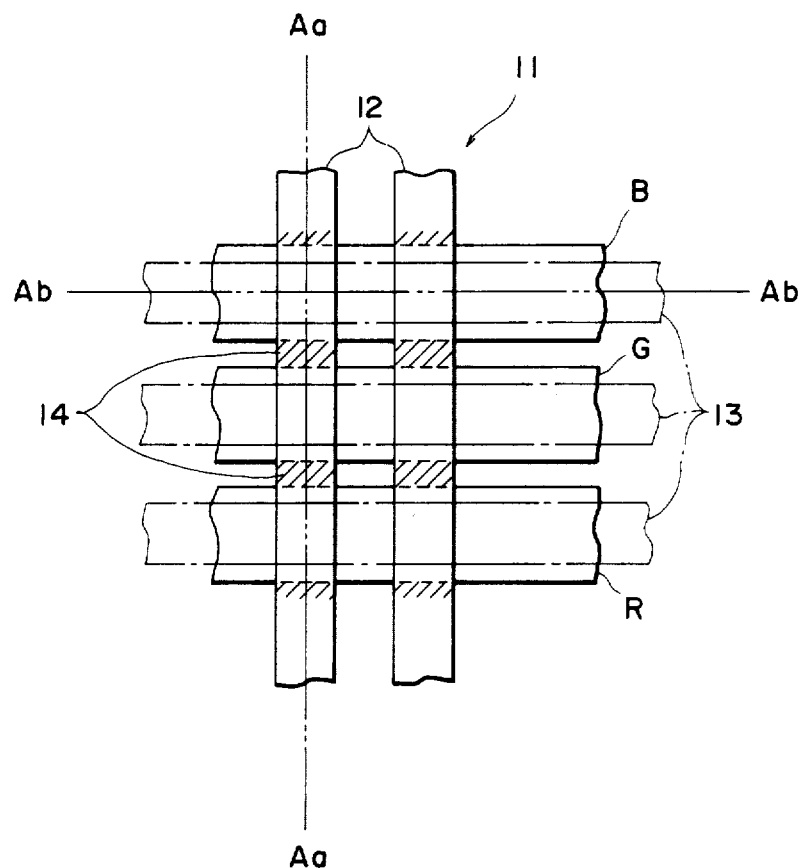
FIG. 1 is a partial plan view of a ferroelectric liquid crystal device according to the present invention.
Figure 2A:
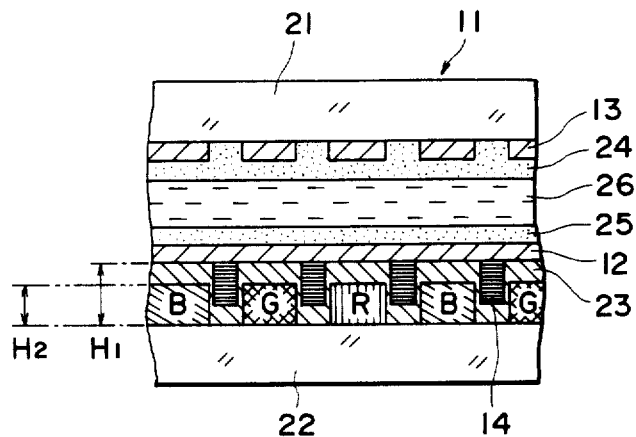
FIG. 2A is a sectional view taken along the line Aa—Aa in FIGS. 1 and 2B is a sectional view taken along the line Ab—Ab in FIG. 1.
Figure 2B:
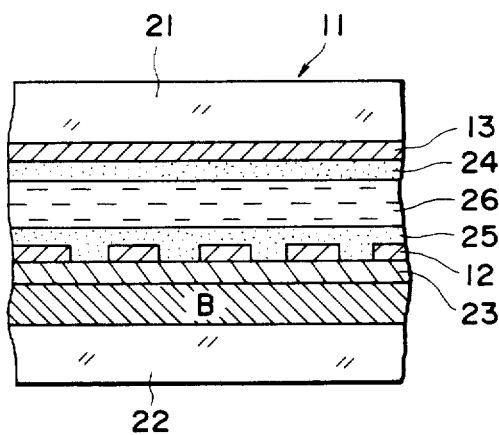

FIG. 1 is a partial plan view of a ferroelectric liquid crystal device 11 of the present invention, FIG. 2A is a sectional view taken along the line Aa—Aa in FIG. 1, and FIG. 2B is a sectional view taken along the line Ab—Ab in FIG. 1. The ferroelectric liquid crystal device 11 comprises transparent stripe electrodes 12 and 13 of, e.g., $SnO_2$, $In_2O_3$ or ITO (indium-tin-oxide) respectively formed on a pair of substrates 21 and 22 composed of glass or plastic plates. The substrate 22 has thereon a layer of color filters B (blue color filter), G (green color filter) and R (red color filter), and a protection film 23 on the color filter layer. Between the discretely defined color filters B, G and R, electroconductive films 14 are disposed so as to be electrically connected to stripe electrodes 12. In the ferroelectric liquid crystal device according to the present invention, alignment control films 24 and 25 are disposed on the substrates 21 and 22, respectively, and a ferroelectric liquid crystal 26 is disposed between the alignment control films 24 and 25.

The stripe electrodes 12 are used as data lines to which data corresponding to given image information are applied, and the stripe electrodes 13 are used as scanning lines to which a scanning signal is sequentially applied, respectively at the time of multiplex driving.

On the substrate 22 with the above structure, a stepwise difference in height given by concavities between the color filters B, G and R is compensated by the electroconductive films 14, so that the surface contacting the ferroelectric liquid crystal is kept substantially flat even if the stripe electrodes 12 and the alignment control films 25 are successively formed on the color filters B, G and R.

In the present invention, the difference between the height $H_1$ of the conductive films 14 and the height $H_2$ of the color filters B, G and R, respectively above the surface of the substrate 22, may be made 1000 Å or less, preferably 500 Å or less. If the difference exceeds 1000 Å, particularly 1200 Å, the thickness of the ferroelectric liquid crystal 26 is liable to be nonuniform over the extension of the ferroelectric liquid crystal device 11 to such an extent that the formation of a monodomain becomes difficult.

Figure 3:
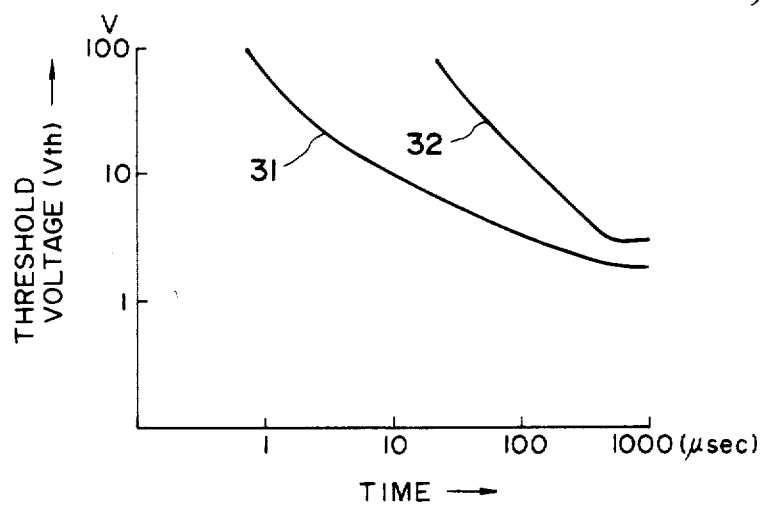
FIG. 3 is a characteristic graph showing relationships between the threshold voltage and voltage application time of ferroelectric liquid crystal devices used in the present invention.

In a preferred embodiment of the present invention, it is desirable that the electroconductive films 14 and the stripe electrodes 12 are placed in electrical continuity with each other so as to decrease the resistance when used as data lines. Particularly, the threshold voltage of a ferroelectric liquid crystal 26 depends on a voltage application period as shown in FIG. 3 wherein the curves 31 and 32 show characteristic curves of ferroelectric liquid crystals HOBACPC and DOBAMBC, respectively. As a result, when the stripe electrodes 12 are made long so as to be adapted to a large display panel and voltages applied to the ferroelectric liquid crystal 26 are considered along a particular stripe electrode 12, a voltage applied at a part closer to a terminal through which a data signal is supplied can be larger than a voltage applied at a part farther from the terminal, so that the ferroelectric liquid crystal 26 can be switched in a shorter application period at the closer portion than at the farther portion. As a result, even if a weak voltage which is not expected to cause an inversion or switching of an orientation state of the ferroelectric liquid crystal is applied, the weak voltage can cause the inversion at the closest part when it is applied continuously for some time during a period of non-selection or non-writing in a multiplexing drive. In contrast thereto, in the present invention, the conductive films 12 are electrically connected to the stripe electrodes, the difference in voltage applied at pixels along a stripe electrode is minimized, so that the generation of crosstalk among pixels on a long data line may be prevented.

Examples of the colored substrates inclusive of colorants for use in the color filters B, G and R include organic pigments or coloring matters of azo-type, anthoraquinone-type, phthalocyanine-type, quinacrydone-type, isoindolinone-type, dioxazine-type, perylene-type, perinone-type, thioindigo-type, pyrrocoline-type, and quinophthalone-type; and inorganic pigments or colored substances such as iron black ($Fe_2O_4$, $FeO.$-$Fe_2O_3$), graphite and $PrMnO_3$.

An organic transparent resin film may be colored with such a colorant. Examples of such an organic resin includes polyparaxylylene (e.g., Palylene (trade name), Union Carbide Corp.), polyethylene, polystyrene, and polycarbonate. Such an organic resin film may be formed by a coating method such as spinner coating. Further, an inorganic film made of a transparent inorganic material such as $SiO_2$, $Al_2O_3$, $TiO_2$, $ZrO_2$, $MgF_2$ or SiO may also be colored with a colorant as described above.

The electroconductive film 14 used in the present invention may be composed of metal or alloy such as aluminum, chromium, aluminum-chromium alloy or aluminum/chromium laminated film. Further, in the present invention, a linear or an elongated electroconductive film can be disposed along one side in the longitudinal direction of each stripe electrode so as to be in electrical continuity with the electroconductive films 14 as described above.

Further, in a different embodiment of the present invention, instead of disposing the electroconductive film 14 on the lower side of the stripe electrodes 12, the electroconductive films 14 may be disposed on the upper side of the stripe electrodes 12.

In the above-mentioned different embodiment of the present invention, insulating films may be used instead of the electroconductive films 14 as described before. The insulating films may preferably be formed of a photosensitive resin. Particularly, by making the difference in height between the height of the insulating films and the height of the color filters, respectively from the surface of the substrate, 1000 Å or less, preferably 500 Å or less, a monodomain of a ferroelectric liquid crystal showing bistability may be stably formed.

The alignment control films 24 and 25 used in the present invention may be formed of a material selected from, for example, resins such as polyvinyl alcohol, polyimide, polyamideimide, polyesterimide, polyester, polycarbonate, polyvinyl acetal, polyvinyl chloride, polyvinyl acetate, polyamide, polystyrene, cellulose resin, melamine resin, urea resin and acrylic resin, or photosensitive polyimide, photosensitive polyamide, cyclic rubber-type photoresist, phenol novalak-type photoresist or electron beam photoresist (such as polymethyl methacrylate, epoxidized-1,4-polybutadiene, etc.). In this instance, the alignment control films 24 and 25 may be provided with a uniaxial orientation axis, for example, by rubbing. Alternatively, the alignment control films 24 and 25 may be formed as films of SiO or $SiO_2$ having a uniaxial orientation axis by oblique vapor deposition. Further, in the present invention, either one of the alignment control films 24 and 25 can be omitted.

The thickness of the alignment control films 24 and 25 may be set to generally 10 Å-1$\mu$, preferably 100 Å to 3000 Å while it depends on the thickness of the ferroelectric liquid crystal 26. The thickness of the ferroelectric liquid crystal 26 may be set to generally 0.2-20$\mu$, preferably 0.5-10$\mu$, while it depends on a particular liquid crystal material used and a required response speed.

The protection film 23 may be composed of a transparent organic film or inorganic film, particularly preferably of a photosensitive resin. The thickness of the protection film 23 may generally be set to a range of 1000 Å-1 $\mu$m.

A liquid crystal layer disposed between a substrate having a color filter layer (color filter substrate) having a good planarity used in the present invention and an opposite substrate, when gradually cooled in the temperature-decreasing stage from the isotropic phase to the liquid crystal phase, develops a liquid crystal phase gradually to provide a uniform monodomain of the liquid crystal phase.

When DOBAMBC showing a ferroelectric liquid crystal phase is taken as an example of a liquid crystal, and the DOBAMBC is gradually cooled from its isotropic phase, it is transferred into smectic A (SmA) phase at about 115° C. At this time, when a substrate is provided with a uniaxial orientation treatment such as rubbing or oblique vapor deposition of SiO$_2$, a monodomain wherein liquid crystal molecules are aligned with their molecular axes extending in parallel with the substrate and in one direction. On further cooling, DOBAMBC is transformed into chiral smectic C phase (SmC* phase) at a specific temperature between about 90°–75° C. depending on the liquid crystal layer thickness. Further, when the liquid crystal layer thickness is about 2μ or less, the helical structure of SmC* phase is unwound or released to provide a ferroelectric liquid crystal showing bistability.

Now, the operational principle of a ferroelectric liquid crystal device will be further described in some detail.

Figure 4:
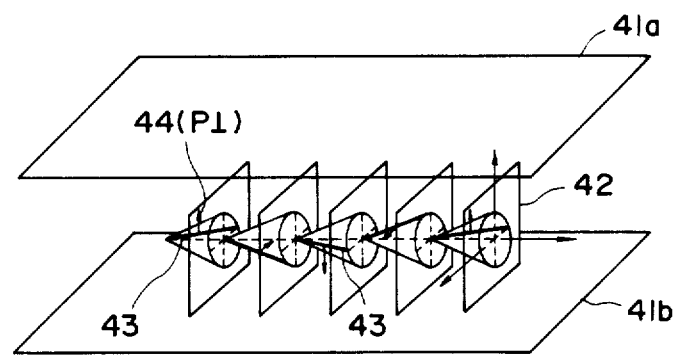
FIGS. 4 and 5 are respectively a schematic perspective view of a ferroelectric liquid crystal device used in the present invention for illustrating an operational principle thereof.
Figure 5:
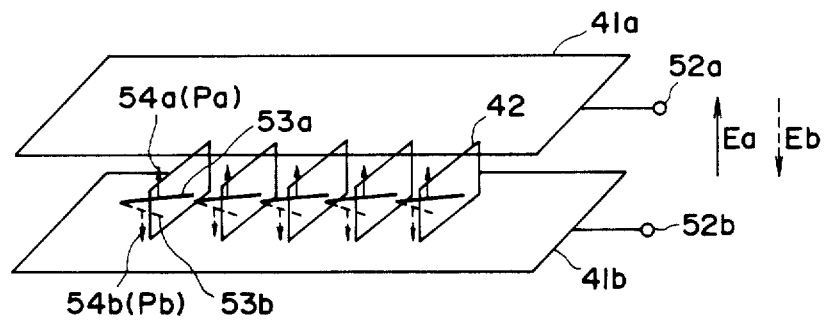

Referring to FIG. 4, there is schematically shown an example of a ferroelectric liquid crystal cell for explanation of its operation. Reference numerals 41a and 41b denote substrates (glass plates) on which a transparent electrode of, e.g., In$_2$O$_3$, SnO$_2$, ITO (indium-tin-oxide), etc., is disposed, respectively. A liquid crystal of, e.g., an SmC*-phase in which liquid crystal molecular layers 42 are oriented perpendicular to surfaces of the glass plates is hermetically disposed therebetween. Full lines 43 show liquid crystal molecules. Each liquid crystal molecule 43 has a dipole moment (P$_\perp$) 44 in a direction perpendicular to the axis thereof. When a voltage higher than a certain threshold level is applied between electrodes formed on the substrates 41a and 41b, a helical structure of the liquid crystal molecules 43 is unwound or released to change the alignment direction of respective liquid crystal molecules 43 so that the dipole moments (P$_\perp$) 44 are all directed in the direction of the electric field. The liquid crystal molecules 43 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, optical characteristics of which vary depending upon the polarity of an applied voltage. Further, when the thickness of the liquid crystal cell is sufficiently thin (e.g., 1–5μ) as used in a preferred embodiment of the present invention, the helical structure of the liquid crystal molecules is unwound to provide a non-helical structure even in the absence of an electric field whereby the dipole moment assumes either of the two states, i.e., Pa in an upper direction 54a or Pb in a lower direction 54b as shown in FIG. 15. When electric field Ea or Eb higher than a certain threshold level and different from each other in polarity as shown in FIG. 5 is applied to a cell having the above-mentioned characteristics, the dipole moment is directed either in the upper direction 54a or in the lower direction 54b depending on the vector of the electric field Ea cr Eb. In correspondence with this, the liquid crystal molecules are oriented in either of a first stable state 53a or a second stable state 53b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 5. When the electric field Ea is applied to the liquid crystal molecules, they are oriented in the first stable state 53a. This state is stably retained even if the electric field is removed. On the other hand, when the electric field Eb, the direction of which is opposite to that of the electric field Ea, is applied thereto, the liquid crystal molecules are oriented to the second stable state 53b, whereby the directions of molecules are changed. This state is also stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible.

A class of liquid crystals most suitable as the ferroelectric liquid crystal 26 used in the present invention may be liquid crystals showing bistability and ferroelectricity. Specific examples thereof include liquid crystals showing chiral smectic C phase (SmC* phase), H phase (SmH* phase), I phase (SmI* phase), J phase (SmJ* phase), K phase (SmK* phase), G phase (SmG* phase) or F phase (SmF* phase). These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compounds usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcilidene-4'-octylaniline (MBRA 8), etc.

When a device is constituted by using these materials, the device may be supported with a block of copper, etc., in which a heater is embedded in order to realize a temperature condition where the liquid crystal compounds assume an SmC* or SmH* phase.

Hereinbelow, the present invention will be explained with reference to specific examples.

EXAMPLE 1

In this example, color filter films were prepared by vapor deposition.

Figure 6A:
FIGS. 6A-6F are sectional views for illustrating steps for preparing a color filter layer used in the present invention.
Figure 6B:
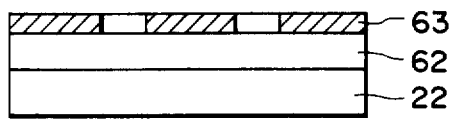
Figure 6C:
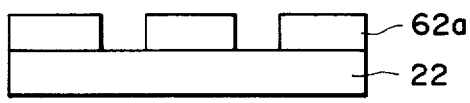

FIGS. 6A–6F show steps for preparation of color pixels of three colors of R, G and B. First, on a glass substrate 22 ("7059", mfd. by Corning Co.), a positive-type resist ("OFPR 77" (trade name), mfd. by Tokyo Ohka K.K.) was applied by a spinner coater to form a 1.0 μm-thick resist layer 62 (FIG. 6A). Then, the resist layer 62 was exposed to light through a mask 63 with a prescribed pattern (FIG. 6B), followed by development with a developer liquid prescribed for OFPR 77 series to form a pattern of prescribed stripes for lifting-off (FIG. 6C).

Then, the entirety of the pattern-formed face of the glass substrate 22 was exposed, and unnecessary residue of the resist at portions other than the pattern was removed from the glass substrate 22 by an oxygen plasma ashing treatment.

Figure 6D:
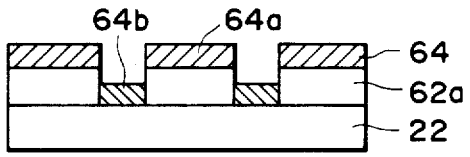

The glass substrate 22 provided with a pattern 62a for lifting-off was placed at a prescribed position in a vacuum evaporator, in which were further disposed two molybdenum boats for evaporation sources, one containing nickel phthalocyanine as an evaporating blue colorant and the other containing Palylene (mfd. by Union Carbide Corp.). Then, the nickel phthalocyanine was first evaporated at 470° C. to be deposited in a thickness of 4500 Å and then Palylene was evaporated at 250° C. to be deposited in a thickness of 1000 Å, respectively on the face having the lifting-off pattern, to form a 5500 Å-thick deposited colorant layer 64 (including portions 64a on the lifting-off pattern and 64b on the substrate. FIG. 6D).

Figure 6E:
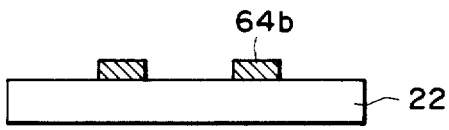

Then, the substrate 22 having the lifting-off pattern 62a and the colored layer 64 was dipped in a developer liquid prescribed for OFPR 77 series under stirring for 5 minutes to remove the resist pattern together with the colored layer 64a deposited on the pattern from the substrate, thereby to form a blue stripe filter 64b (FIG. 6E).

Then, green and red stripe filters were respectively prepared through the steps as described with reference to FIGS. 6A–6E.

More specifically, a 5500 Å-thick green colored layer was prepared by first vapor-depositing a 5000 Å layer of lead phthalocyanine as a green colorant for vapor deposition and then vapor-depositing a 500 Å-thick layer of Palylene.

Further, a 5500 Å-thick red colored layer was formed by first vapor-depositing a 3000 Å-thick layer of an anthoraquinone-base red colorant and then vapor depositing a 2500 Å-thick layer of Palylene.

Figure 6F:
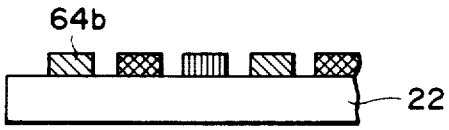

In the manner as described above, color filters of B, G and R stripes having substantially the same thickness as shown in FIG. 6F were formed.

Then, a 1μ-thick protection film 23 as shown in FIG. 2 of a negative type resist was formed through a coating step.

Then, in order to fill the resultant concavities of 2500 Å in depth and 5 μm in width between the color filters at portions to be below stripe electrodes which were to be formed on the color filters, i.e., between neighboring color filters, 2500 Å-thick electroconductive films 14 of Al were formed.

More specifically, on the protection film 13, the photoresist OFPR as used above was applied and was exposed to light selectively at the concave portions at which the metal films were formed, followed by development. Then, Al was vapor-deposited, and the remaining photoresist was removed in a solvent (MIBK) to cause lifting-off, thereby to leave the electroconductive films 14 at the prescribed parts. As a result, the resultant color filter substrate was formed to have a substantially flat surface at this stage. Incidentally, according to the above procedure, there may remain portions where no electroconductive films are formed between the filters, but these portions are outside the effective display area, so that no ill effect is exerted to a display even if the alignment of liquid crystal molecules is somewhat disordered thereby.

Then, a 500 Å-thick ITO film was formed by sputtering and patterned into stripe electrodes 12 as shown in FIG. 2.

The positional relationship between the stripe electrodes 12 and the color filters R, G and B thus formed is shown in FIG. 1. As shown in FIG. 1, on the color filters R, G and B were disposed the stripe electrodes 12 so as to form a matrix electrode arrangement in combination with stripe electrodes 13 formed on an opposite substrate 21. Pixels are formed at respective intersections of the upper and lower stripe electrodes 12 and 13, and the electroconductive films 14 are formed at the hatched portions.

Then, alignment control films 24 and 25 were respectively formed by applying a polyimide-forming solution ("PIQ", Hitachi Kasei Kogyo) by means of a spinner coater rotating at 3000 rpm, followed by heating at 150° C. for 30 minutes to provide a 2000 Å-thick polyimide film, the surface of which was treated by rubbing.

The thus prepared color filter substrate 22 and the opposite substrate 21 were applied to each other to form a cell, followed by injection of a ferroelectric liquid crystal DOBAMBC and sealing to prepare a liquid crystal device. The liquid crystal device was observed through a cross nicol polarizing microscope, whereby the liquid crystal molecules disposed inside were found to form a bistable monodomain without forming undesirable alignment defects.

EXAMPLE 2

In this example, color filter films were prepared by a dyeing process.

First, on a glass substrate ("7059", mfd. by Corning Co.), an aqueous photosensitive liquid of casein containing ammonium dichromate was applied and dried to form a film of 1.0 μm in thickness.

The photosensitive film was then exposed to light through a photomask with a prescribed pattern, followed by development, rinsing and drying (120° C., 30 minutes) to form a layer to be dyed.

Then, the above treated glass substrate was dipped in a bath of a blue dye (Kayanol Blue, mfd. by Nihon Kayaku K.K.) at 60° C. for 5 min. for blue dyeing, followed by drying at 100° C. for 30 min. to form a 1.5 μm-thick blue-dyed pattern.

Subsequently, a photoresist ("ODUR", Tokyo Ohka Kogyo K.K.) was applied on the blue-dyed pattern, followed by pre-baking, exposure, development, rinsing and drying to form a 1.5μm-thick resin layer only on the blue-dyed pattern to provide a blue color filter having a total thickness of 3.0 μm.

Then, a similar aqueous photosensitive liquid of casein containing ammonium dichromate as described above was applied over the blue color filter layer, followed by prebaking, exposure, development, rinsing and drying to form a layer to be dyed in green.

Then, the above glass substrate was dipped in a bath of a green dye (Suminol Milling Brilliant Green) at 60° C. for 3 min. for dyeing in green, followed by drying at 100° C. for 30 min. to form a 1.0 μm-thick green dyed pattern.

Then, in a similar manner as above, a 2.0 μm-thick resin layer was formed only on the green-dyed pattern to provide a green color filter having a total thickness of 3.0 μm.

Then, in the manner as described above, a layer to be dyed in red was formed and dyed in red by dipping in a bath of a red dye (Kayanol Milling Red RS, mfd. by Nihon Kayaku K.K.) at 60° C. for 3 min., followed by drying at 100° C. for 30 min. to form a red-dyed pattern.

Then, in a similar manner as above, a 1.3 μm-thick resin layer was formed only on the red-dyed pattern to provide a red color filter having a total thickness of 3.0 μm.

The resin layers formed as above also have a function of preventing color mixing between the dyed layers.

Then, a photoresist ("ODUR", Tokyo Ohka Kogyo K.K.) was applied over the color filters, followed by exposure, development, rinsing, and drying to form a 1 μm-thick protection layer.

Then, 1.4 μm-thick electroconductive films for filling the remaining concavities of 1.4 μm in depth and 5 μm in width between the color filters, and electrodes and alignment control films were prepared and subjected to rubbing in the same manner as in Example 1.

The color filter substrate and an opposite substrate prepared as in Example 1 were applied to each other to form a cell, followed by injection of DOBAMC and sealing to prepare a liquid crystal device. The liquid crystal device was observed through a cross nicol polarizing microscope, whereby the liquid crystal molecules disposed inside were found to form a bistable monodomain without resulting in alignment defects similarly as in Example 1.

Incidentally, in addition to those specifically used in this example, other dyes for coloring may be used similarly, such as Sumilar Fast Yellow RF (acetoacetic anilide-type), Sumilar Fast Red (monoazo-type), Kayaset Blue 318 (disperse dye), and Mikethrene Yellow (indanthrene-type).

EXAMPLE 3

A ferroelectric liquid crystal cell was prepared in the same as in Example 1 except that graphite conductive films were formed instead of the aluminum conductive films, whereby a bistable monodomain was found to be formed without resulting in undesirable alignment defects.

As described above, according to the present invention, flattening film members comprising electroconductive films or insulating films are disposed to fill concavities between color filters on a substrate, so that a surface unevenness due to discretely provided color filters can be removed to prevent occurrence of alignment defects. Further, as the electroconductive films are disposed to be electrically connected to the stripe electrodes, the resistance along the stripe electrodes can be lowered, so that the driving characteristics may be improved. As a result, there may be provided a ferroelectric liquid crystal device which can fully exhibit the characteristics of a ferroelectric liquid crystal.

What is claimed is:

1. A ferroelectric liquid crystal device, comprising a pair of substrates each provided with a stripe electrode and a ferroelectric liquid crystal disposed between the substrates; at least one of the substrates having thereon a layer of discretely defined color filters disposed along the stripe electrode and electroconductive films disposed between the discretely defined color filters.

2. A liquid crystal device according to claim 1, wherein said electroconductive films are disposed in electrical continuity with the stripe electrode.

3. A liquid crystal device according to claim 1, wherein an elongated electroconductive film is disposed along the longitudinal direction of the stripe electrode and in electrical continuity with the electroconductive films.

4. A liquid crystal device according to claim 1, wherein said layer of discretely defined color filters is disposed on the stripe electrode.

5. A liquid crystal device according to claim 1, wherein said layer of discretely defined color filters is disposed between the stripe electrode and the substrate.

6. A liquid crystal device according to claim 1, wherein said electroconductive films comprise a film of metal or alloy.

7. A liquid crystal device according to claim 1, wherein the difference between the height of said layer of color filters and the height of the electroconductive films, respectively from the substrate face, is 1000 Å or less.

8. A liquid crystal device according to claim 1, wherein the difference between the height of said layer of color filters and the height of the electroconductive films, respectively from the substrate face, is 500 Å or less.

9. A liquid crystal device according to claim 1, wherein said at least one substrate having the layer of color filters also has an alignment control film on its face contacting the ferroelectric liquid crystal.

10. A liquid crystal device according to claim 9, wherein said alignment control film has a uniaxial orientation axis.

11. A liquid crystal device according to claim 10, wherein said uniaxial orientation axis is a rubbing axis.

12. A liquid crystal device according to claim 10, wherein said uniaxial orientation axis is an oblique vapor deposition axis.

13. A liquid crystal device according to claim 1, wherein said color filters comprises an organic or inorganic film colored with a colored substance.

14. A liquid crystal device according to claim 13, wherein said colored substance is a colorant.

15. A liquid crystal device according to claim 1, wherein said ferroelectric liquid crystal is a chiral smectic liquid crystal.

16. A liquid crystal device according to claim 15, wherein said chiral smectic liquid crystal is disposed in a layer thin enough to release the helical structure of the chiral smectic liquid crystal.

17. A ferroelectric liquid crystal device, comprising a pair of substrates each provided with a stripe electrode and a ferroelectric liquid crystal disposed between the substrates; at least one of the substrates having thereon a layer of discretely defined color filters disposed along the stripe electrode and insulating films disposed between the discretely defined color filters, and the difference between the height of said layer of color filters and the height of the insulating films, respectively from the substrate face, being 1000 Å or less.

18. A liquid crystal device according to claim 17, wherein the difference between the height of said layer of color filters and the height of the insulating films, respectively from the substrate face, is 500 Å or less.

19. A liquid crystal device according to claim 17, wherein said at least one substrate having the layer of color filters also has an alignment control film on its face contacting the ferroelectric liquid crystal.

20. A liquid crystal device according to claim 19, wherein said alignment control film has a uniaxial orientation axis.

21. A liquid crystal device according to claim 20, wherein said uniaxial orientation axis is a rubbing axis.

22. A liquid crystal device according to claim 20, wherein said uniaxial orientation axis is an oblique vapor deposition axis.

23. A liquid crystal device according to claim 17, wherein said color filters comprise an organic or inorganic film colored with a colored substance.

24. A liquid crystal device according to claim 23, wherein said colored substance is a colorant.

25. A liquid crystal device according to claim 17, wherein said ferroelectric liquid crystal is a chiral smectic liquid crystal.

26. A liquid crystal device according to claim 25, wherein said chiral smectic liquid crystal is disposed in a layer thin enough to release the helical structure of the chiral smectic liquid crystal.

* * * * *

UNITED STATES PATENT AND TRADEMARK OFFICE
CERTIFICATE OF CORRECTION

PATENT NO. : 4,712,874

DATED : December 15, 1987

INVENTOR(S) : NOBUYUKI SEKIMURA, ET AL.

It is certified that error appears in the above-identified patent and that said Letters Patent is hereby corrected as shown below:

COLUMN 1

Line 68, "in" (first occurrence) should be deleted.

COLUMN 2

Line 29, "FIGS. 1 and 2B" should read --FIG. 1 and FIG. 2B--.

COLUMN 3

Line 48, "12" should be deleted.
Lines 54-55, "anthoraquinone-type," should read --anthraquinone-type,--.
Line 63, "includes" should read --include--.

COLUMN 5

Line 7, after "direction" insert --is obtained--.
Line 44, "device, opti-" should read --device, the opti---.

UNITED STATES PATENT AND TRADEMARK OFFICE
CERTIFICATE OF CORRECTION

PATENT NO. : 4,712,874

DATED : December 15, 1987

INVENTOR(S) : NOBUYUKI SEKIMURA, ET AL.

It is certified that error appears in the above-identified patent and that said Letters Patent is hereby corrected as shown below:

COLUMN 5 (continued)

Line 54, "FIG. 15." should read --FIG. 5.--.
Line 60, "cr" should read --or--.

COLUMN 6

Line 12, "being" should be deleted.
Line 28, "Submicro Second" should read --Submicrosecond--.

COLUMN 7

Line 24, "5000 Å layer" should read --5000 Å-thick layer--.
Line 30, "anthoraquinone-base" should read --anthraquinone-base--.

COLUMN 8

Line 52, "green dyed" should read --green-dyed--.

UNITED STATES PATENT AND TRADEMARK OFFICE
CERTIFICATE OF CORRECTION

PATENT NO. : 4,712,874
DATED : December 15, 1987
INVENTOR(S) : NOBUYUKI SEKIMURA, ET AL.

It is certified that error appears in the above-identified patent and that said Letters Patent is hereby corrected as shown below:

COLUMN 9

Line 11, "DOBAMC" should read --DOBAMBC--.

COLUMN 10

Line 21, "comprises" should read --comprise--.

Signed and Sealed this

Twenty-eighth Day of June, 1988

Attest:

DONALD J. QUIGG

Attesting Officer     Commissioner of Patents and Trademarks